United States Patent
Denton et al.

(10) Patent No.: US 8,412,973 B1
(45) Date of Patent: Apr. 2, 2013

(54) DETECTION OF A CHARACTERISTIC OF A PERIODIC WAVEFORM

(75) Inventors: Bruce A. Denton, Ocala, FL (US);
Anthony J. Cowan, Ocala, FL (US);
David L. Harding, Inglis, FL (US)

(73) Assignee: Qualcomm Incorporated, San Diego, CA (US)

( * ) Notice: Subject to any disclaimer, the term of this patent is extended or adjusted under 35 U.S.C. 154(b) by 182 days.

(21) Appl. No.: 12/831,563

(22) Filed: Jul. 7, 2010

Related U.S. Application Data

(60) Provisional application No. 61/223,582, filed on Jul. 7, 2009.

(51) Int. Cl.
*G06F 1/26* (2006.01)
(52) U.S. Cl. .......................... 713/340; 713/300
(58) Field of Classification Search ........... 713/300–340
See application file for complete search history.

(56) References Cited

U.S. PATENT DOCUMENTS

| | | | |
|---|---|---|---|
| 3,723,769 A | 3/1973 | Collins | |
| 4,051,394 A | 9/1977 | Tieden | |
| 5,416,404 A | 5/1995 | Baldwin | |
| 5,789,960 A | 8/1998 | Bower | |
| 7,366,297 B1 * | 4/2008 | Marshall et al. | 379/413.03 |
| 7,539,882 B2 * | 5/2009 | Jessup et al. | 713/300 |
| 2006/0101296 A1 * | 5/2006 | Mares et al. | 713/300 |
| 2006/0158912 A1 * | 7/2006 | Wu et al. | 363/89 |
| 2009/0027847 A1 * | 1/2009 | Li | 361/686 |

OTHER PUBLICATIONS

O'Neil II, V. Patrick et al., "A Monolithic Optically Isolated Zero Crossing Triac Driver." 1978 International Electron Devices Meeting, vol. 24, 1978, pp. 307-309.

* cited by examiner

*Primary Examiner* — Raymond Phan
(74) *Attorney, Agent, or Firm* — DeLizio Gilliam, PLLC

(57) ABSTRACT

A method and apparatus for providing an interface between a communications device and a medium carrying an approximately periodic waveform are presented. The method includes providing a first signal in response to detecting a predetermined characteristic of the approximately periodic waveform using switching circuitry that draws a first amount of power drawn from the medium, and in response to the first signal, detecting the predetermined characteristic of the approximately periodic waveform using detecting circuitry that draws a second amount of power drawn from the medium, where the detecting circuitry detects the predetermined characteristic with greater accuracy in time than the switching circuitry detects the predetermined characteristic, and the second amount of power drawn from the medium is greater than the first amount of power.

28 Claims, 13 Drawing Sheets

DETECTION OF A CHARACTERISTIC OF A PERIODIC WAVEFORM

CROSS-REFERENCE TO RELATED APPLICATIONS

This application claims priority to U.S. Application Ser. No. 61/223,582, filed on Jul. 7, 2009, incorporated herein by reference.

TECHNICAL FIELD

This description relates to managing power consumption in network communications.

BACKGROUND

Communication systems are designed to reliably transfer information using the underlying physical medium. Well-known communication systems like Ethernet use special wiring (e.g., Cat 5 cable) for exchanging information. With the increasing need for ubiquitous exchange of information, a new class of no-new-wire systems has emerged. Such systems use existing infrastructure to exchange information. Power line communication systems are one example of such systems. Power line communication systems use existing AC wiring to exchange information. Owing to their being designed for much lower frequency transmissions, AC wiring provides varying channel characteristics at the higher frequencies used for data transmission (e.g., depending on the wiring used and the actual layout).

SUMMARY

In one aspect, in general, a method provides an interface between a communications device and a medium carrying an approximately periodic waveform. The method includes providing a first signal in response to detecting a predetermined characteristic of the approximately periodic waveform using switching circuitry that draws a first amount of power drawn from the medium, and in response to the first signal, detecting the predetermined characteristic of the approximately periodic waveform using detecting circuitry that draws a second amount of power drawn from the medium, where the detecting circuitry detects the predetermined characteristic with greater accuracy in time than the switching circuitry detects the predetermined characteristic, and the second amount of power drawn from the medium is greater than the first amount of power.

Aspects can include one or more of the following features.

The detecting circuitry switches from a low power state to a high power state in which the detecting circuitry draws power from the medium while detecting the characteristic during a predetermined interval commencing after the detection of the predetermined characteristic by the switching circuitry.

The predetermined interval is between about 10% and 25% of an average period of the approximately periodic waveform.

The detecting circuitry detects the same instance of the characteristic as the switching circuitry.

The detecting circuitry detects a different instance of the characteristic as the switching circuitry.

The switching circuitry activates in response to receiving a second signal.

The first signal is provided during some periods of the approximately periodic waveform for at least part of the period and is not provided during other periods of the approximately periodic waveform.

The first signal is provided during each period of the approximately periodic waveform for at least part of the period.

The approximately periodic waveform carries alternating current.

A time associated with the occurrence of the detected characteristic to a communications device is indicated.

The indicated time associated with the occurrence of the detected characteristic is used to determine a time of transmitting a beacon transmission that is used for coordinating communications on a communications network.

The medium is electrically isolated from the detecting circuitry when first signal is not provided.

The detected characteristic is a zero crossing.

In another aspect, in general, an apparatus provides an interface between a communications device and a medium carrying an approximately periodic waveform. The apparatus includes detecting circuitry configured to detect a characteristic of the approximately periodic waveform and indicate a time associated with the occurrence of the detected characteristic to the communications device, and switching circuitry that switches the detecting circuitry between a high power state in which the detecting circuitry draws power from the medium while detecting the characteristic and a low power state in which the detecting circuitry draws less power from the medium than in the high power state, where power consumed by the switching circuitry during an average period of the approximately periodic waveform is less than power consumed by the detecting circuitry during the average period when in the high power state.

Aspects can include one or more of the following features.

The switching circuitry is configured to switch the detecting circuitry between the high power state and the low power state in response to receiving a first signal from the communications device.

The communications device is electrically isolated from the switching circuitry and the detecting circuitry.

The apparatus includes trigger circuitry that draws less power from the medium during the average period than the detecting circuitry during the average period when in the high power state and that provides a second signal based on a detected characteristic of the approximately periodic waveform.

The switching circuitry switches the detecting circuitry in response to receiving the second signal in addition to the first signal.

The switching circuitry enables the trigger circuitry when receiving the first signal.

The trigger circuitry provides the second signal at regular intervals.

The trigger circuitry provides the second signal for a portion of the period of the approximately periodic waveform.

The trigger circuitry provides the second signal during some periods of the approximately periodic waveform for at least part of the period and does not provide the second signal during other periods of the approximately periodic waveform.

The trigger circuitry provides the second signal during each period of the approximately periodic waveform for at least part of the period.

The approximately periodic waveform carries electrical power.

The approximately periodic waveform carries alternating current.

The communications device uses the indicated time associated with the occurrence of the detected characteristic of the approximately periodic waveform to determine a time of transmitting a beacon transmission that is used for coordinating communications on a communications network.

The medium is electrically isolated from the detecting circuitry when the detecting circuitry is in the low power state.

The detected characteristic is a zero crossing.

Among the many advantages of the invention (some of which may be achieved only in some of its various aspects and implementations) are the following.

Higher data rates can be achieved in power line communication systems by taking into account the fact that the noise and/or the frequency response of the power line channel between any pair of communications devices depends on the AC line cycle phase. Power line communication systems share the power line medium with various appliances that draw electric power from the power supply grid. These devices are one of the major sources of noise that affect the characteristics of power line channels. Several types of such devices generate noise that varies with the AC line cycle phase. FIG. 1 shows an example in which the noise around the zero crossing on the AC line cycle is lower by comparison to the noise at the peaks of the AC cycle. Some devices turn on and off during each AC line cycle. These devices not only generate impulse noise, but also change the frequency response of the power line channel (e.g., by a load on the line that attenuates some frequencies more than others). Further, several devices that use AC motors (e.g., vacuum cleaners, drills, etc.) generate noise that is also a function of the phase of the line cycle. The net effect is a time varying channel whose noise characteristics and frequency response depend on the AC line cycle phase.

The communications devices coupled to the power line medium can take advantage of AC line cycle knowledge to limit channel interference and thus increase performance of power line communications. For example, transmissions over the power line medium and observations of the medium (e.g., for generating tone maps for modulating carriers and different frequencies) can be frequency and phase-locked to the AC line cycle. Zero-cross detection circuitry can be used to provide the AC line cycle frequency and phase knowledge used to optimize transmission and tone map generation algorithms. The zero-cross detection circuitry and associated power control circuitry can be configured to reduce power consumption for power line communications devices both during normal operation and while operating in power saving modes. For example, emerging international regulatory requirements that specify active and standby power consumption limits that can be met using low-power circuit implementations that include a mix of more efficient power supply technologies and low-power circuit topologies.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
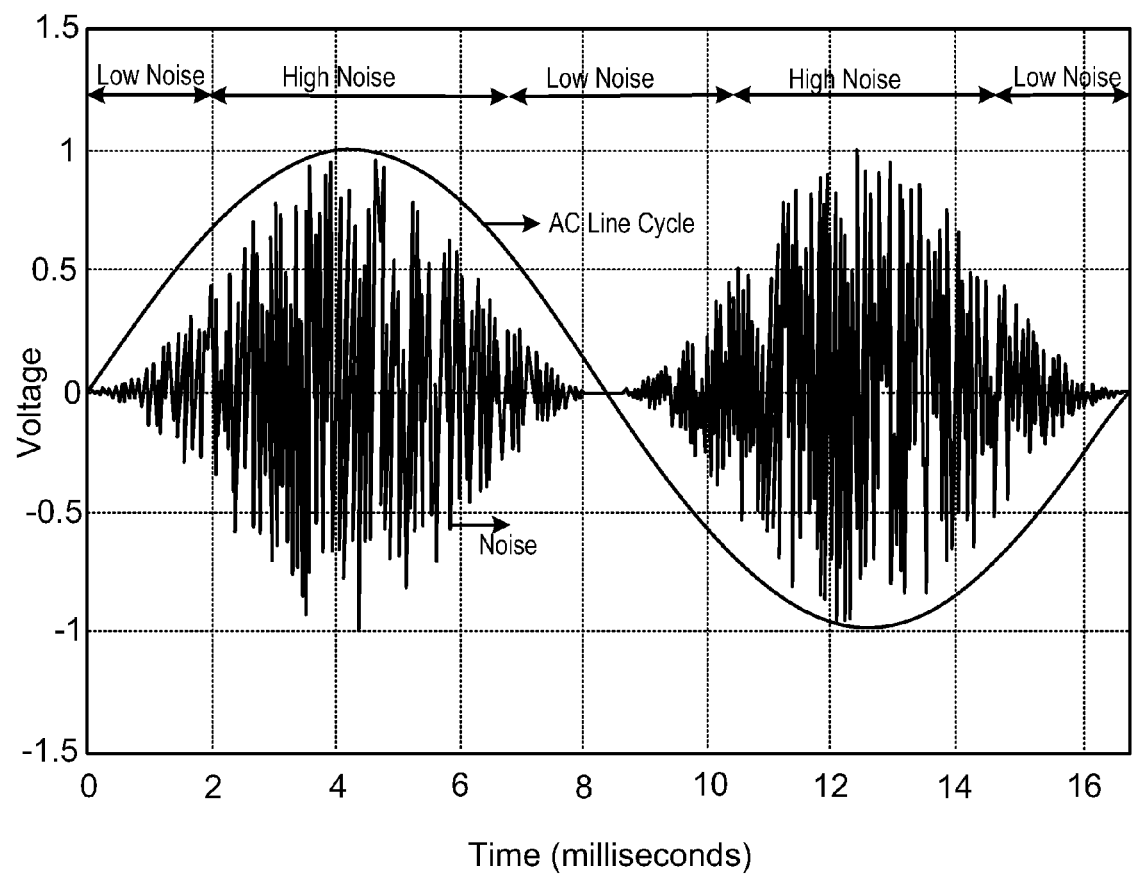
FIG. 1 shows an example of the variation in noise with AC line cycle waveform period.
Figure 2A:
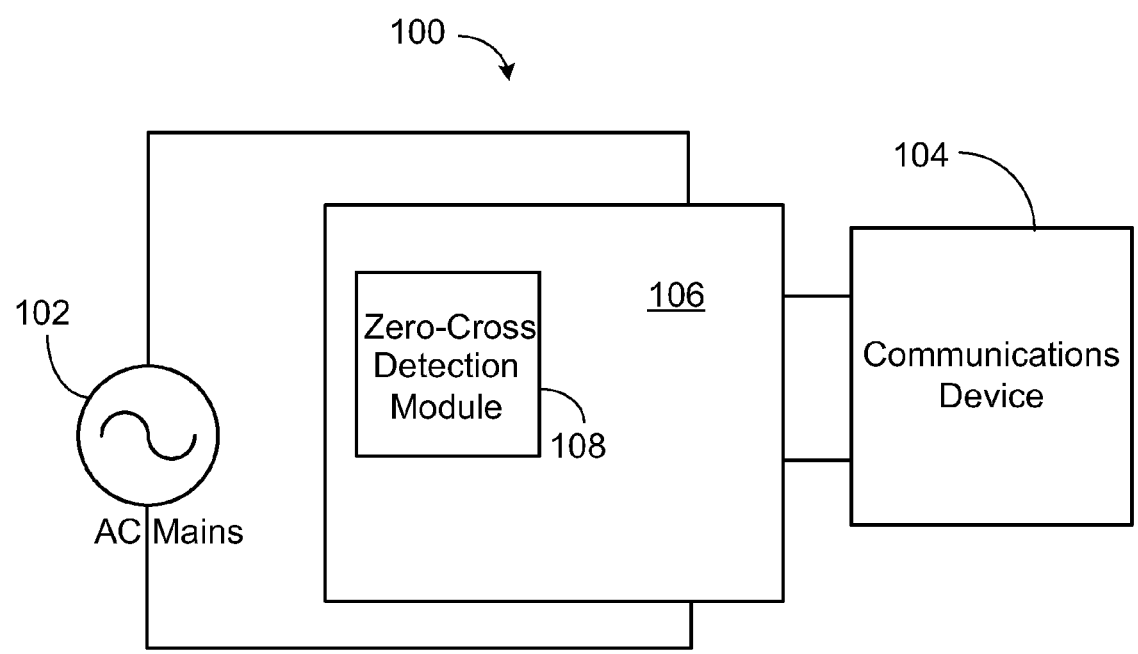
FIG. 2A is a block diagram of a communications medium interface.

FIG. 2A shows an exemplary configuration for an interface 100 between a communications device and a communications medium shared with other communications devices. Because many buildings contain extensive wiring for supplying power, the communications medium can be partially made up of some of this wiring. The power line wiring (also called "AC mains" wiring) in a building carries alternating current (AC) waveform that propagates over the wiring to deliver power to various locations throughout the building, and so the communications medium carries both a power distribution waveform (also called the AC line cycle) and communications signals.

When using the AC mains 102 as a communications medium, a communications device 104 can use additional components to optimize its method of communication. For example, digital communications traveling over the AC mains 102 may encounter electrical noise at certain points of the AC line cycle. The communications device 104 might operate with lower noise and fewer errors when communicating at intervals that are synchronized with the zero crossings of the AC line cycle waveform. The AC line cycle waveform is approximately periodic (e.g., approximately a sine wave with a frequency of 60 Hz or 50 Hz), but may vary from exact periodicity such that each zero crossing of the waveform may vary by some unpredictable amount from the location that would be predicted based on a previous zero crossing and the nominal waveform period. The communications device 104 can use a network interface module 106 that includes a zero-cross detection module 108 for synchronizing to the AC line cycle. The zero-cross detection module 108 provides information to the communications device 104 about when the zero crossings occur so that the communications device can coordinate its communications with this information.

The zero-cross detection module 108 is only enabled when it is providing information about the zero-crossings to the communications device 104. Because the zero-cross detection module 108 is disabled at other times, the module requires a relatively small amount of power.

The zero-cross detection module 108 provides information about the zero-crossings when the AC line cycle approaches a zero-crossing, and when the communications device 104 requires this information to use the communications medium. Thus, the zero-cross detection module 108 is enabled and disabled according to the state of both the AC line cycle and the communications device 104.

Network Communications

The communications device 104 uses a network interface module 106 that converts data to and from a signal waveform that is transmitted over the communication medium, as does any other device using the communications medium as a network. Any of a variety of communication system architectures can be used to implement the portion of the network interface module 106 that converts data to and from a signal waveform that is transmitted over the communication medium. An application running on a device provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with control information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables devices to share the power line medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), and Wavelet modulations can be used. Forward error correction (FEC) codes like Viterbi codes, Reed-Solomon codes, concatenated code, turbo codes, low density parity check code, etc., can be employed by the PHY to overcome errors.

Some implementations of the PHY layer use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2B:
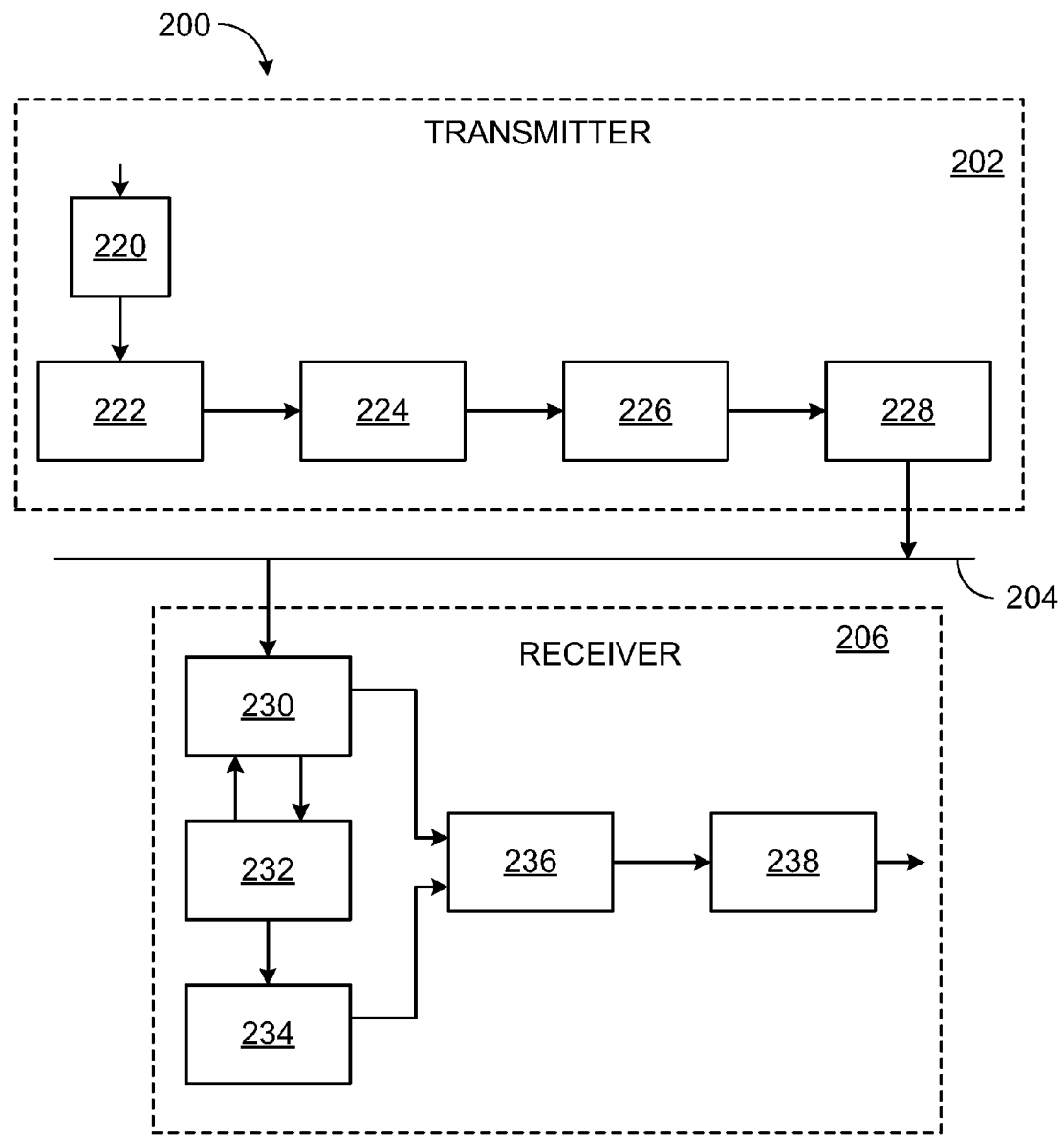
FIG. 2B is a block diagram of a communications system.

Referring to FIG. 2B, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each device. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving device, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N, $A_i$ is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(τ, t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Network devices can have differences in the specific communication protocols used, and are still able to communicate with each other if the protocols are compatible. An example of a difference between the protocol layers (or "protocol stack") used by different types of devices is the use of a "central coordinator" (CCo) device. The CCo is a communications device that is selected to provide certain coordination functions for at least some of the other devices in the network configuration. A set of devices operating under the coordination of a single CCo is called a Basic Service Set (BSS). Functions performed by the CCo include: authentication of devices upon joining the BSS, provisioning of identifiers for devices, and scheduling and timing of medium access. For example, the CCo broadcasts a repeated beacon transmission from which the devices in the BSS can determine scheduling and timing information. This beacon transmission includes fields that carry information used by the devices to coordinate communication. Though the format of each of the repeated beacon transmission is similar, the content typically changes in each transmission. The beacon transmission is repeated approximately periodically, and, in some implementations, is synchronized to a characteristic of the communication medium 230. In some cases, a Proxy Coordinator (PCo) can be used to manage devices that are "hidden" from the CCo (e.g., devices that do not reliably receive signals from the CCo).

Various devices in a network may generate regular beacon transmissions for various purposes. A repeated beacon transmission from a CCo to each of the devices in a BSS is called a Central Beacon (CB) transmission. The devices may communicate with each other in time periods between CB transmissions, provided the power line channel characteristics between any two communicating devices permits it.

One of the main functions of CB transmission is to carry medium allocation (or scheduling) information. The scheduling information allocates some of the time between CB transmissions as a contention period during which devices may contend for access to the power line medium. The scheduling information also allocates a contention-free period during which times slots are assigned to particular devices for access to the power line medium.

The CB transmission is synchronized with respect to the AC line cycle such that the time between CB transmissions (or "beacon period") is based on the underlying AC line cycle frequency. The CB transmission can be synchronized to the AC line cycle by transmitting the CB at a fixed time interval from a detectable feature of the power line waveform such as a zero crossing. The CCo device can use the zero-cross detection module to synchronize the beacon period with the zero crossings, such as scheduling a CB transmission for a certain amount of time before or after a zero crossing. The beacon period can be set to any multiple of a half of the AC line cycle period, for example, by waiting for a given number of zero crossings.

In some cases it is desirable to increase the beacon period to make more efficient use of the medium by reducing the overhead such as the percentage of time devoted to sending "control" information in the CB transmission. There is also overhead associated with control information associated with transmissions from the devices. It may also be desirable to keep the beacon period small enough to provide a desired number of transmission opportunities in a given length of time. Thus, the beacon period can be selected according to a trade-off between keeping overhead low and latency between transmission opportunities low. For example, in some implementations the beacon period is selected to be twice the AC line cycle period. In this case, when operating in power line environments with an AC line cycle frequency of 60 Hz, the beacon period would be approximately 33.33 msec. When operating in power line environments with an AC line cycle frequency of 50 Hz, the beacon period would be approximately 40 msec. Variations in the beacon period may occur due to drift in the AC line cycle frequency.

In some implementations, a zero-cross detection module 108, described above with respect to FIG. 2A, may take into account the length of the beacon period with respect to the AC line cycle. For example, the CCo device also can detect a zero crossing for some AC cycles and not others, and can optionally turn off the zero-cross detection module for the other cycles, as described in more detail below.

Further details of various implementations of the communications network are described in more detail in U.S. Patent Publication No. 2007/0025391, incorporated herein by reference.

Low-Power Zero-Cross Detection

An electronically switched low-power AC line cycle zero-cross detection module reduces the AC power consumption in power saving modes for power line communications equipment. The zero-cross detection module can include zero-cross detection circuitry that produces an optically coupled signal with edges corresponding to the approximate location of the AC line cycle zero-crossings and logic level operated, mains isolated enable/disable circuitry that reduces or removes current flow through the zero-cross detection circuitry when the device enters a low-power state. The zero-cross detection circuitry and the enable/disable circuitry both incorporate isolation between the power line and digital detection and control interface circuitry to meet regulatory safety standards.

The enable/disable circuitry can use a switch circuit to prevent current flow between "mains line" and "mains neutral" terminals of the AC power line. This is called "switched zero-cross detection." When the switch circuit is in the on or active state, current flows from the mains line (or mains neutral) terminal, through the zero-cross detection circuitry, to the mains neutral (or mains line) terminal thus enabling the zero-cross detection function. When the switch circuit is in the off or inactive state, minimal leakage current flows through the zero-cross detection circuitry, thus disabling the zero-cross detection function and reducing the power consumption of the zero-cross detection module. This switched zero-cross detection functionality enables the communications device 104 to control the state of the zero-cross detection module 108 using a control signal to move the module into or out of a low-power idle state, for example. During the low-power idle state the portion of the zero-cross detection module that includes the zero-cross detection circuitry, which draws relatively more power, is turned off, while the rest of the zero-cross detection module, which draws relatively less power, remains on and ready to respond to a control signal that switches out of the low-power idle state.

Further, when the zero-cross detection module is in the active state, a switch circuit can be used to periodically turn the zero-cross detection circuitry on and off such that the circuitry is on during predetermined intervals surrounding the zero crossings and off during predetermined intervals away from the zero crossings. For example, a trigger circuit, such as an AC mains triggered monostable multivibrator, can be used to control the state of the switch circuit and activate/deactivate the zero-cross detection circuitry. This is called "windowed zero-cross detection." The monostable multivibrator is triggered by the AC signal and is active for a period of time just long enough for zero-cross detection by the zero-cross detection circuitry. The period of time can be thought of as a "window" in which zero-cross detection can occur. For example, in some implementations, the window could be an interval of time of approximately 10% to 25% of an average period of the AC line cycle, such as 15% or 20% of the average period. The zero-cross detection circuitry is then disabled for the remainder of the AC line cycle, reducing overall power consumption of the system. The trigger circuit remains on while the zero-cross detection circuitry is switched off, but draws less power than the zero-cross detection circuitry so it still saves power compared with leaving the zero-cross detection circuitry on during all of the active state. The trigger circuit itself also has the ability to detect zero crossings, but does not detect the zero crossing with the same level of accuracy. For example, the trigger circuit may activate with time variation, or "jitter," relative to the occurrences of the zero crossings. In some implementations, the window occurs every period of the AC line cycle. In other implementations, the window occurs at a predetermined multiple of the period of the AC line cycle (e.g., if the beacon period is twice the AC line cycle period with CB transmissions a fixed delay after every other zero crossing, it may not be necessary to detect zero crossings when the CB transmission is not being transmitted). Further, in some implementations, the trigger circuit may activate the zero-cross detection circuitry after a period of lag passes. For example, the trigger circuit may detect a zero crossing and delay for a period of time corresponding to a portion of the AC line cycle period, so that the zero-cross detection circuitry is triggered at approximately the expected time of a subsequent zero crossing. Thus, in this example, the zero-cross detection circuitry detects a different instance of the zero crossing than does the trigger circuit.

Figure 3A:
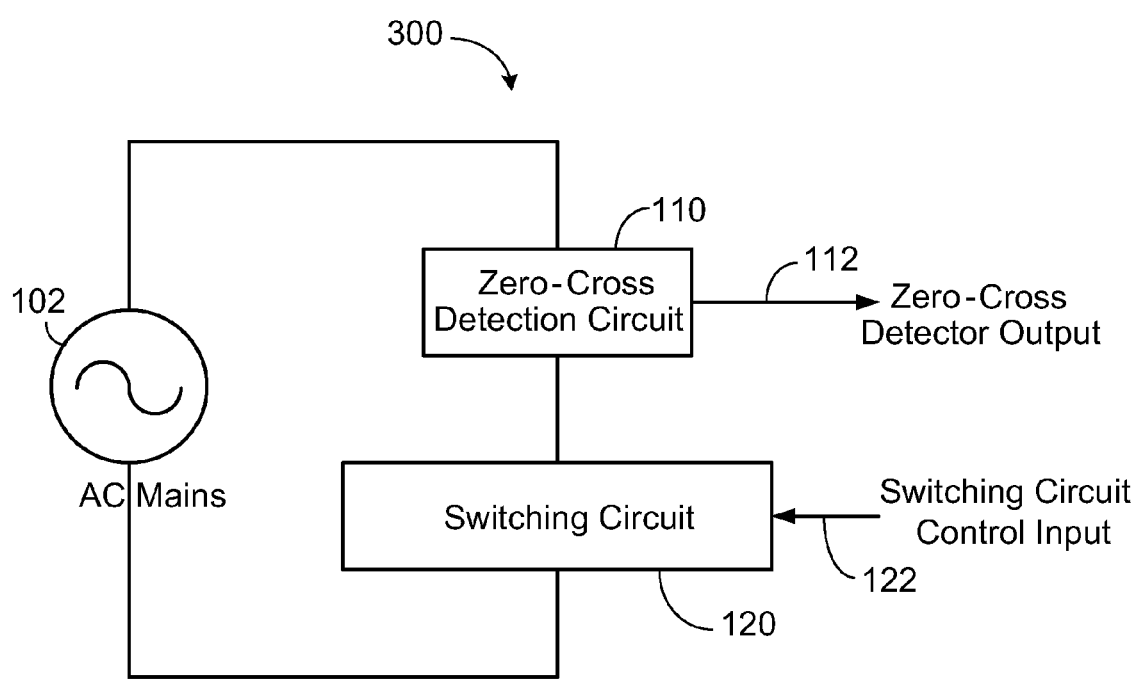
FIGS. 3A and 3B are block diagrams of zero-cross detection modules.

FIG. 3A depicts the topology of an exemplary zero-cross detection module 300 incorporating switched zero-cross detection. The zero-cross detection module 300 includes a zero-cross detection circuit 110 in series with a switching circuit 120. The zero-cross detection circuit 110 includes an AC mains detection circuit, a digital control logic section that operates in the low-voltage DC domain and an isolation mechanism between the AC mains detection circuit and the digital control logic section. The zero-cross detection circuit 110 also has a zero-cross detector output 112 that can be provided to a digital circuit. The switching circuit 120 opens and closes the series circuit to deactivate and activate the zero-cross detection circuit 110 and includes an AC mains switch device, a digital control logic section that operates in the low-voltage DC domain and an isolation mechanism between the AC mains switch and the digital control logic section. The switching circuit 120 has a switching circuit control input 122 that a digital circuit can use to turn the switching circuit on and off.

Figure 3B:
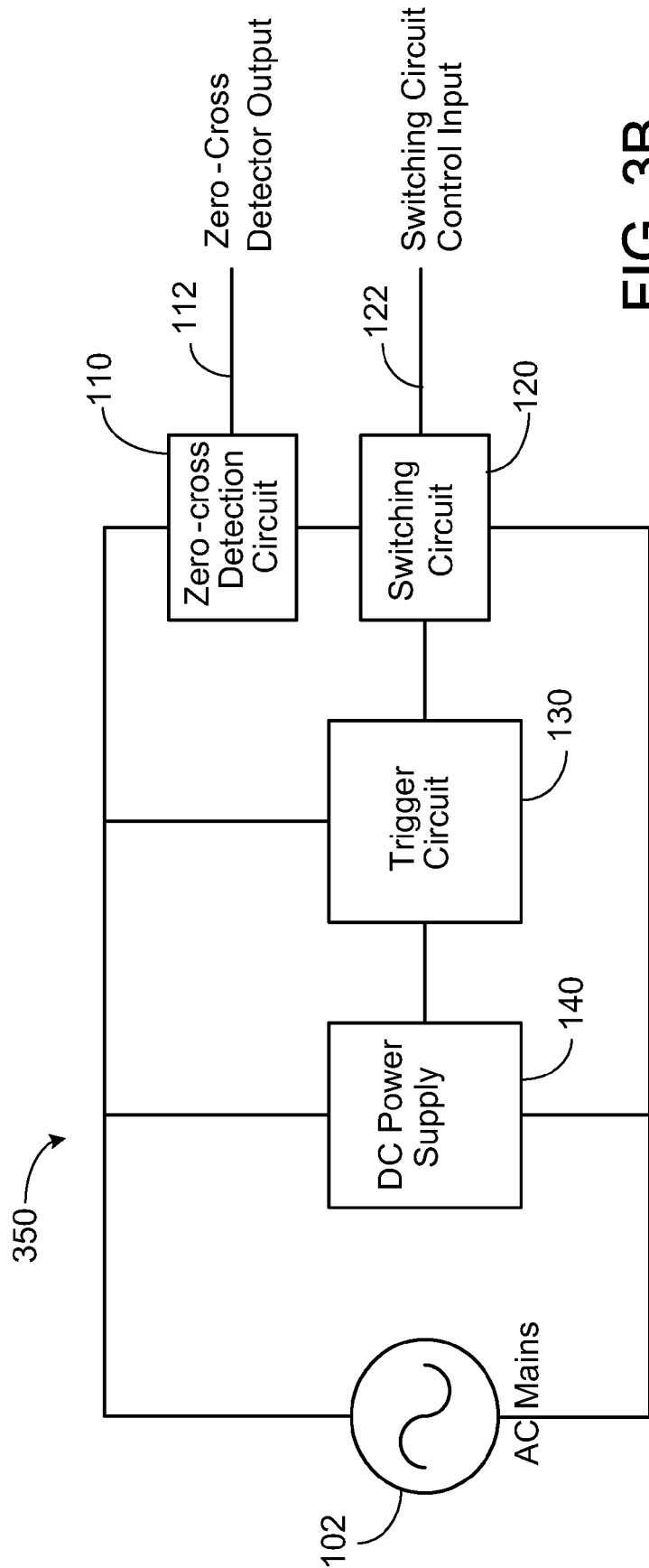

FIG. 3B depicts the topology of an exemplary zero-cross detection module 350 incorporating windowed zero-cross detection. In this module 350, the zero-cross detector switch 120 enables and disables the zero-cross detection circuit 110 based on the signal 122 and another signal provided by a trigger circuit 130. The trigger circuit 130 activates in response to the signal provided by the AC mains 102 and provides a signal to the switch 120 to activate the zero-cross detection circuit 110 in anticipation of the zero crossing. The trigger circuit 130 may also activate in response to another event. Some of the components may draw power from a DC power supply 140.

Figure 4:
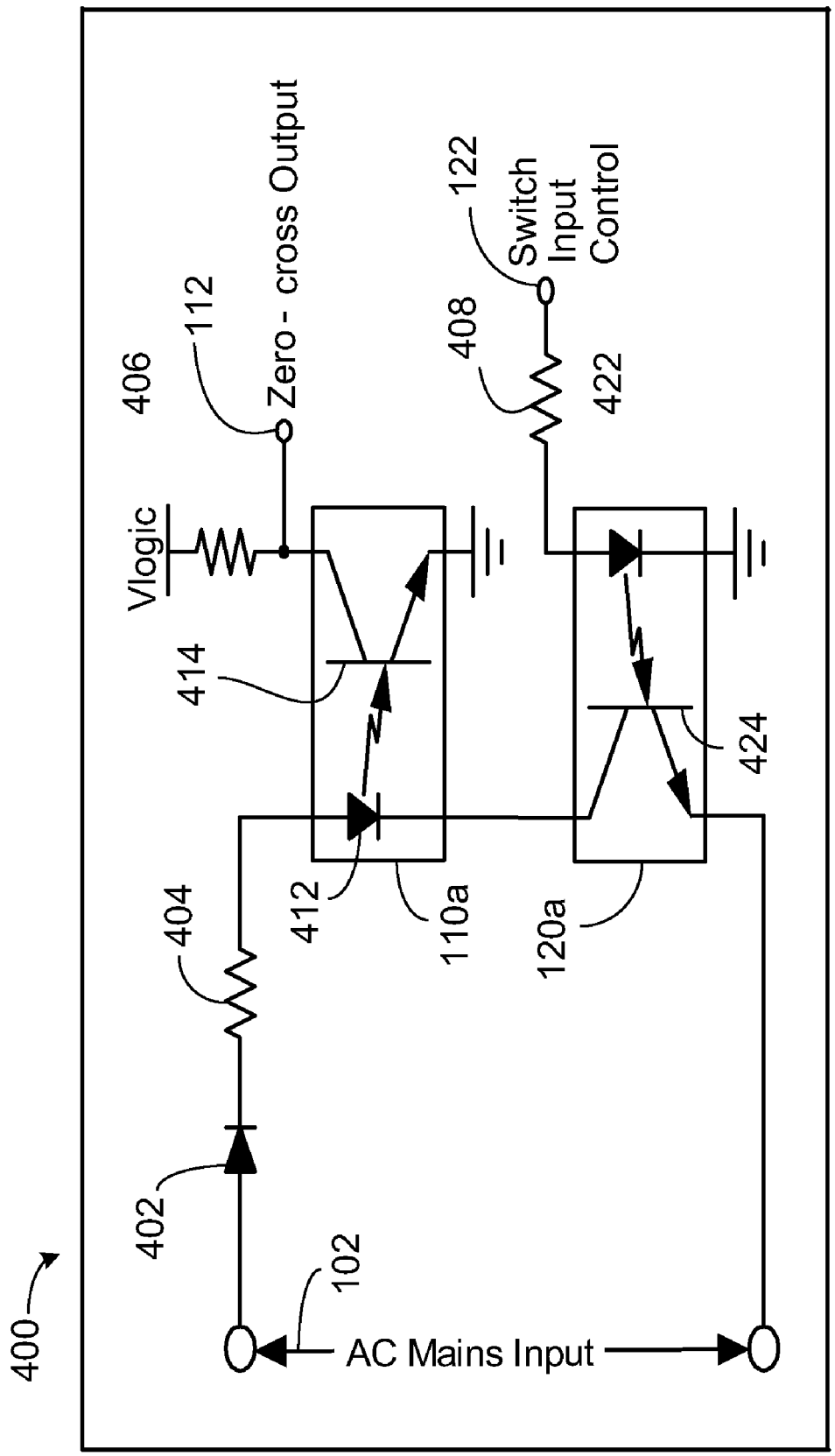
FIGS. 4-7 are circuit diagrams of a zero-cross detection module.

FIG. 4 depicts a possible implementation of a module 400 that includes the switch circuit implementing switched zero-cross detection. Optical isolator 110a provides the zero-cross detection function. Diode 402 half-wave rectifies the AC mains 102 input signal. When the mains voltage is in the negative half-cycle, no current flows through the optical isolator's photodiode 412 and the optical isolator's phototransistor 414 is turned off allowing the zero-cross output 112 to assume a logic high level. When the AC mains 102 voltage enters the positive half-cycle, the current through the optical isolator's photodiode 412 reaches a level sufficient to turn on the optical isolator's phototransistor 414 and the zero-cross output is pulled to a logic low level. A resistor 404 limits the current through the optical isolator's photodiode 412 and a second resistor 406 limits the collector current though the optical isolator's phototransistor 414.

The module 400 has a second optical isolator 120a incorporating a phototransistor 424 as the switching element and provides the switching circuit function. When the switch control input 122 is at logic low, no current flows through the second optical isolator's photodiode 422 and the second optical isolator's phototransistor 424 is turned off. In this case, no current can flow through the first optical isolator's photodiode 412 so the zero-cross function is disabled and in the low-power state. When the switch control input 122 is at logic high, current flows through the second optical isolator's photodiode 422 and the second optical isolator's phototransistor 424 is turned on. In this case, current can flow through the first optical isolator's photodiode 412 and the zero-cross function is enabled. A third resistor 408 sets the current through the second optical isolator's photodiode 422.

Figure 5:
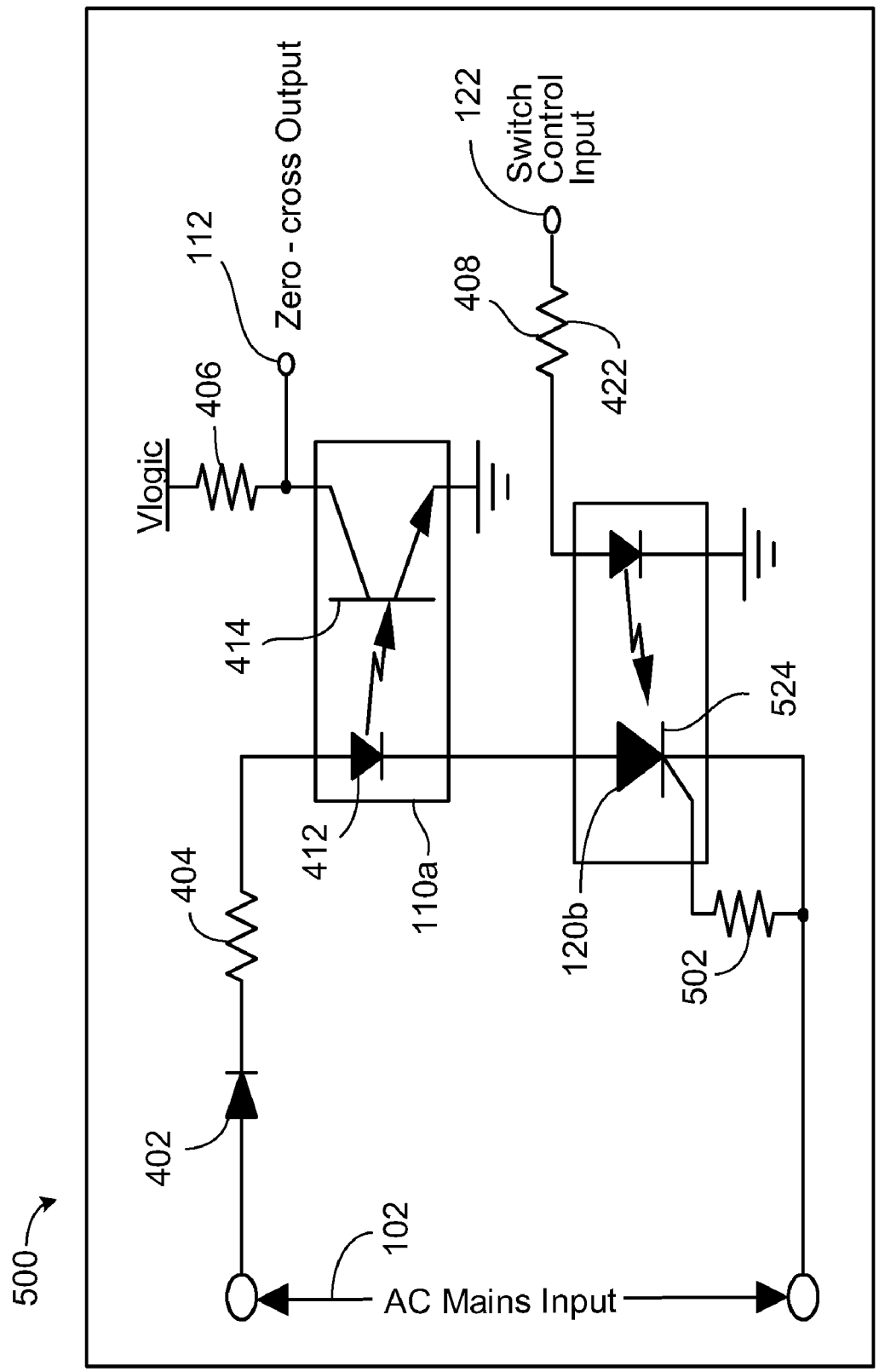

FIG. 5 depicts an alternate implementation of a module 500 using an optical isolator 120b incorporating a photo-silicon-controlled rectifier (photo-SCR) 524 as the switching element. The photo-SCR 524 is connected to a resistor 502. Basic operation of this implementation of the module 500 is similar to that of the implementation of the module 400.

Figure 6:
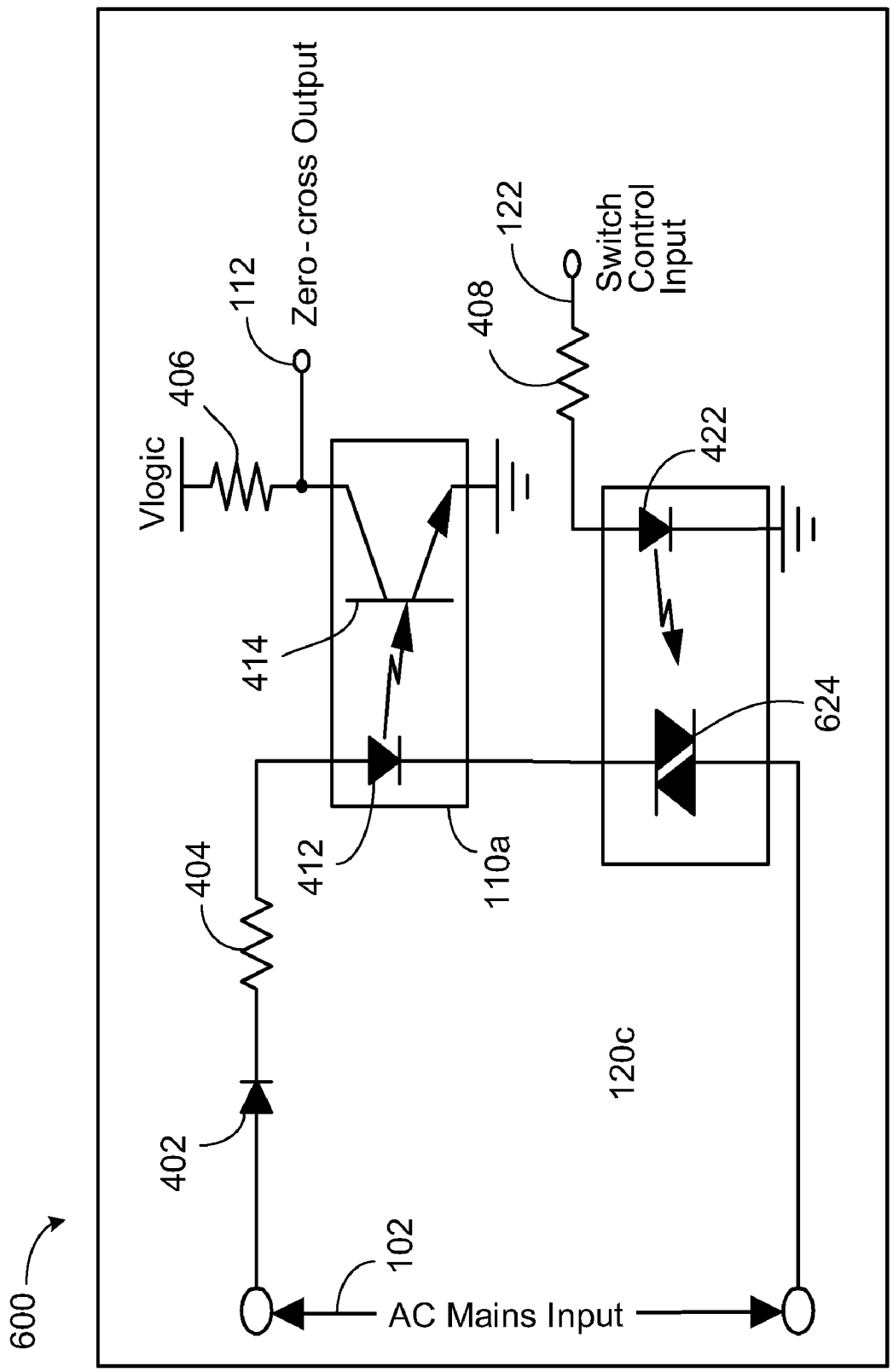

FIG. 6 depicts an alternate implementation of a module 600 using an optical isolator 120c incorporating a photo-triode for alternating current (photo-TRIAC) 624 as the switching element. Basic operation of this implementation of the module 600 is similar to that of the implementation of the module 400.

Figure 7:
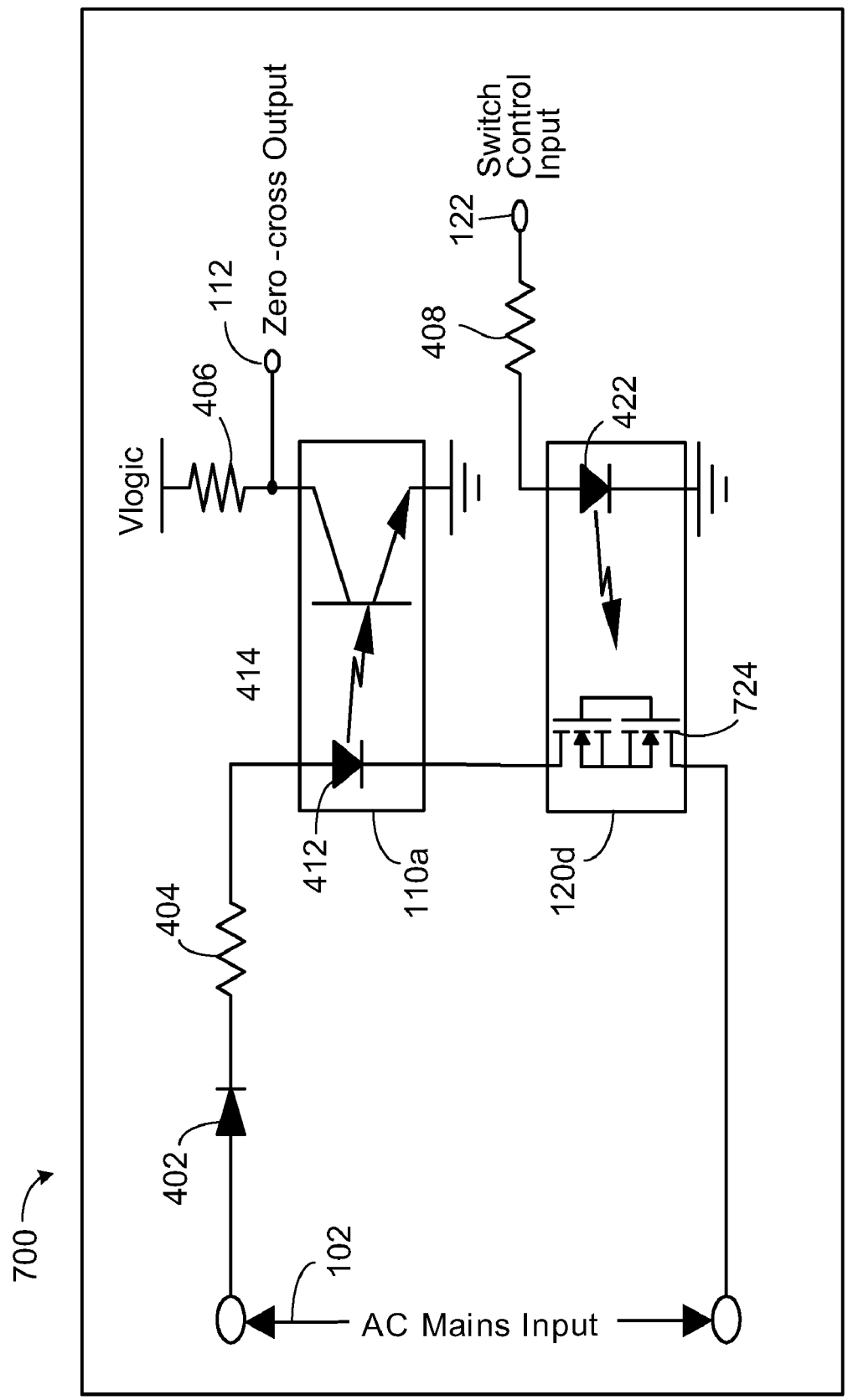

FIG. 7 depicts an alternate implementation of a module 700 using an optical isolator 120d incorporating a photo-metal oxide semiconductor field effect transistor (photo-MOSFET) 724 as the switching element (OPTO2). Basic operation of this implementation of the module 700 is similar to that of the implementation of the module 400.

Figure 8:
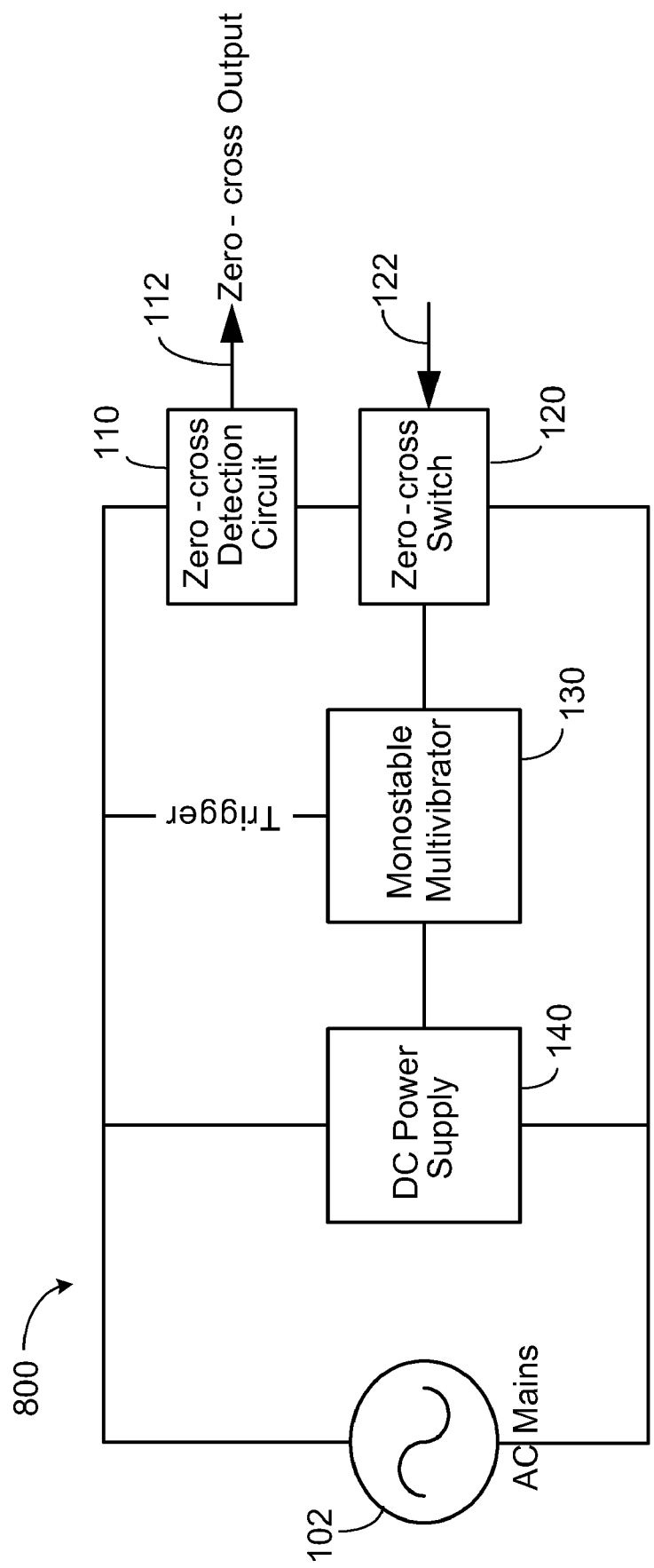
FIG. 8 is a block diagram of a zero-cross detection module.

FIG. 8 depicts the topology of an implementation of a low-power zero-cross detection module 800 implementing windowed zero-cross detection. The circuit includes an AC mains zero-cross detection circuit 110, a monostable multivibrator 130 as the trigger circuit, a zero-cross switch 120 and a DC power supply 140. The zero-cross switch 120 opens and closes the series circuit through the zero-cross detection circuit 110 to activate and deactivate zero-cross detection for a predefined time determined by the monostable multivibrator 130. The predefined time can be any percentage of the AC line cycle period, as determined by the configuration of the monostable multivibrator 130. The monostable multivibrator 130 is triggered by the AC mains 102 signal. Since the time the zero-cross detection circuit 110 is enabled is less than the time for the full AC line cycle period, overall power dissipation of the zero-cross detection circuitry is reduced.

Figure 9:
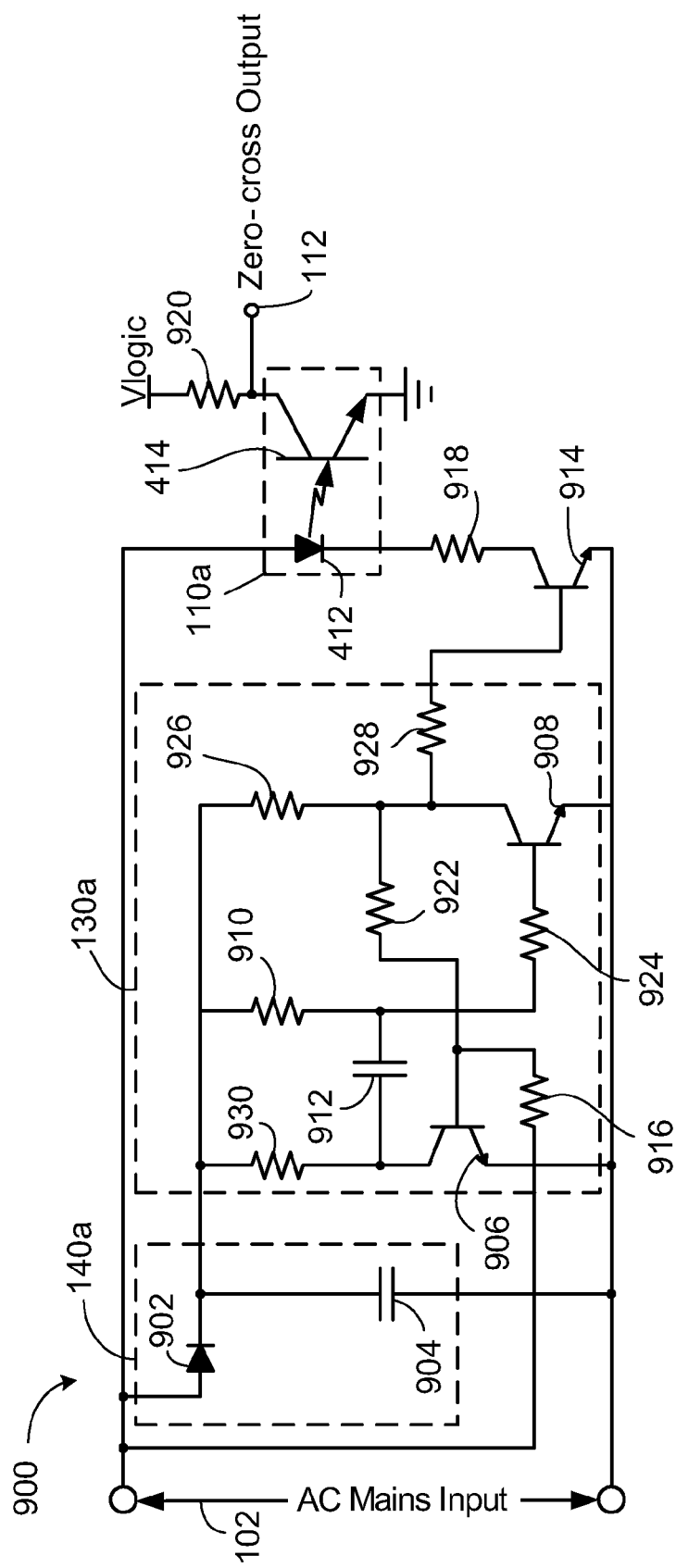
FIGS. 9-10 are circuit diagrams of a zero-cross detection module.

FIG. 9 depicts one possible implementation of a low-power zero-cross detection module 900. An optical isolator 110a provides the zero-cross detection function. A diode 902 and capacitor 904 form a simple half-wave power supply 140a to power the AC mains-side control circuitry. Transistors 906, 908 and associated circuitry form a monostable multivibrator 130a with a time constant determined by another resistor 910 and capacitor 912. Another transistor 914 provides the on/off switch control of the zero-cross detection circuit. When the AC mains 102 voltage is in the negative half-cycle, the transistor 914 is turned OFF and no current flows through the optical isolator's photodiode 412. This causes the optical isolator's phototransistor 414 to be turned off allowing the zero-cross output 112 to assume a logic high level. When the AC mains voltage enters the positive half-cycle, the monostable multivibrator 130a is triggered by the AC mains voltage sampled through another resistor 916, turning on the transistor 914 acting as the switch and enabling the zero-cross detection circuit 110a. When current through the optical isolator's photodiode 412 reaches a level sufficient to turn on the optical isolator's phototransistor 414, the zero-cross output 112 is pulled to a logic low level, providing the zero-cross indication to subsequent logic-level circuitry. When the monostable multivibrator 130a times out, determined by the time constant of the resistor 910 and capacitor 912, the transistor 914 is again turned OFF, disabling current flow through the optical isolator 110a and disabling the zero-cross detection circuit. Another resistor 918 limits the current through the optical isolator's photodiode 412 and another resistor 920 limits the collector current though the optical isolator's logic-level phototransistor 414. The monostable multivibrator 130a may also have other resistors 922, 924, 926, 928, 930.

Figure 10:
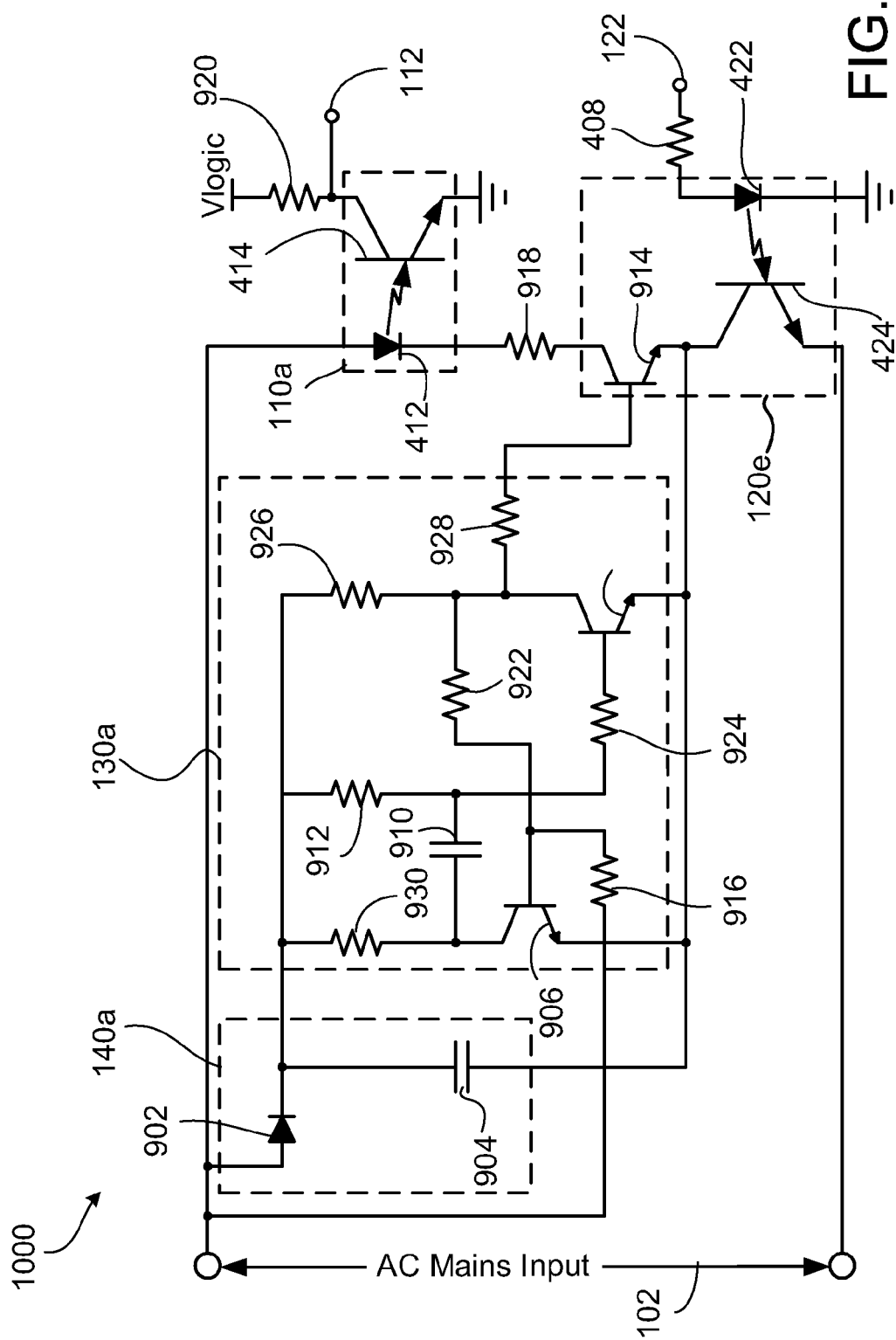

FIG. 10 depicts one possible implementation of the low-power zero-cross detection module 1000 implementing switched zero-cross detection and windowed zero-cross detection. The module 1000 includes a phototransistor 424 as the switching element that provides switched zero-cross detection functionality. As described above with respect to FIG. 4, the phototransistor 424 allows current to pass based on the state of the switch control input 122. Any of the other implementations described above with respect to FIGS. 5-7 may also be used to provide additional switching circuit functionality. The zero-cross detector switch 120e enables the zero-cross detection circuit 110a when both the phototransistor 424 is enabled by the switch control input 122 and the transistor 914 is enabled by the monostable multivibrator 130e. A digital communications device 104 can be connected to both the switch control input 122 and the zero-cross output 112 and remain electrically isolated from the rest of the module 1000. When a device connected to the control input 122 turns off the phototransistor 424 of the zero-cross detector switch 120e, both the zero-cross detection circuit 110a and the monostable multivibrator 130a are disabled and draw minimal power.

Figure 11:
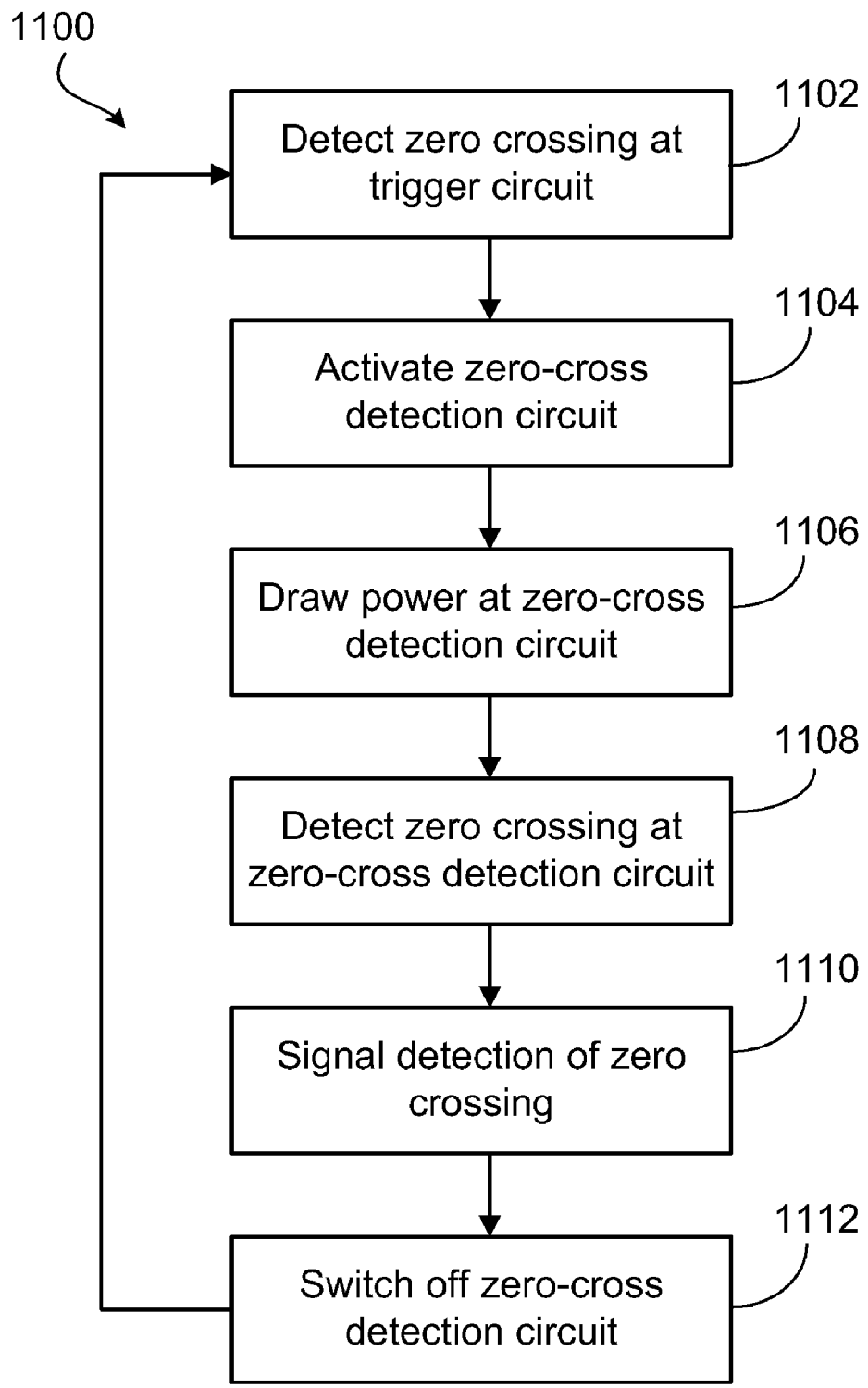
FIG. 11 is a flowchart for a zero-cross detection process.

FIG. 11 shows a flowchart 1000 detailing operations of a low-power zero-cross detection system. In step 1102, a trigger circuit detects a zero-crossing of a signal, for example, an AC mains waveform. In step 1104, the trigger circuit activates a zero-cross detection circuit. In step 1106, the zero-cross detection circuit begins drawing power. In step 1108, the zero-cross detection circuit detects the zero crossing. In step 1110, the zero-cross detection circuit signals the detection of the zero crossing at a zero-cross detector output. In step 1112, the zero-cross detection circuit stops drawing power and switches off. The cycle can repeat at step 1102 upon the detection of the next zero crossing.

Many other implementations of the invention other than those described above are within the invention, which is defined by the following claims.

What is claimed is:

1. A method for providing an interface between a communications device and a medium carrying an approximately periodic waveform, the method comprising:
providing a first signal in response to detecting a predetermined characteristic of the approximately periodic waveform using switching circuitry that draws a first amount of power drawn from the medium; and
in response to the first signal, detecting the predetermined characteristic of the approximately periodic waveform using detecting circuitry that draws a second amount of power drawn from the medium, where the detecting circuitry detects the predetermined characteristic with greater accuracy in time than the switching circuitry detects the predetermined characteristic, and the second amount of power drawn from the medium is greater than the first amount of power.

2. The method of claim 1, in which the detecting circuitry switches from a low power state to a high power state in which the detecting circuitry draws power from the medium while detecting the characteristic during a predetermined interval commencing after the detection of the predetermined characteristic by the switching circuitry.

3. The method of claim 1, further comprising activating the switching circuitry in response to receiving a second signal.

4. The method of claim 1, in which the first signal is provided during some periods of the approximately periodic waveform for at least part of the period and is not provided during other periods of the approximately periodic waveform.

5. The method of claim 1, in which the first signal is provided during each period of the approximately periodic waveform for at least part of the period.

6. The method of claim 1, in which the approximately periodic waveform carries alternating current.

7. The method of claim 1, further comprising indicating a time associated with the occurrence of the detected characteristic to a communications device.

8. The method of claim 1, further comprising electrically isolating the medium from the detecting circuitry when first signal is not provided.

9. The method of claim 1, in which the detected characteristic is a zero crossing.

10. The method of claim 2, in which the predetermined interval is between about 10% and 25% of an average period of the approximately periodic waveform.

11. The method of claim 2, in which the detecting circuitry detects the same instance of the characteristic as the switching circuitry.

12. The method of claim 2, in which the detecting circuitry detects a different instance of the characteristic as the switching circuitry.

13. The method of claim 7, further comprising using the indicated time associated with the occurrence of the detected characteristic to determine a time of transmitting a beacon transmission that is used for coordinating communications on a communications network.

14. An apparatus for providing an interface between a communications device and a medium carrying an approximately periodic waveform, the apparatus comprising:
   detecting circuitry configured to detect a characteristic of the approximately periodic waveform and indicate a time associated with the occurrence of the detected characteristic to the communications device; and
   switching circuitry that switches the detecting circuitry between a high power state in which the detecting circuitry draws power from the medium while detecting the characteristic and a low power state in which the detecting circuitry draws less power from the medium than in the high power state, where power consumed by the switching circuitry during an average period of the approximately periodic waveform is less than power consumed by the detecting circuitry during the average period when in the high power state.

15. The apparatus of claim 14, in which the switching circuitry is configured to switch the detecting circuitry between the high power state and the low power state in response to receiving a first signal from the communications device.

16. The apparatus of claim 14, in which the approximately periodic waveform carries electrical power.

17. The apparatus of claim 14, in which the communications device uses the indicated time associated with the occurrence of the detected characteristic of the approximately periodic waveform to determine a time of transmitting a beacon transmission that is used for coordinating communications on a communications network.

18. The apparatus of claim 14, in which the medium is electrically isolated from the detecting circuitry when the detecting circuitry is in the low power state.

19. The apparatus of claim 14, in which the detected characteristic is a zero crossing.

20. The apparatus of claim 15, in which the communications device is electrically isolated from the switching circuitry and the detecting circuitry.

21. The apparatus of claim 15, further comprising trigger circuitry that draws less power from the medium during the average period than the detecting circuitry during the average period when in the high power state and that provides a second signal based on a detected characteristic of the approximately periodic waveform.

22. The apparatus of claim 16, in which the approximately periodic waveform carries alternating current.

23. The apparatus of claim 21, in which the switching circuitry switches the detecting circuitry in response to receiving the second signal in addition to the first signal.

24. The apparatus of claim 21, in which the switching circuitry enables the trigger circuitry when receiving the first signal.

25. The apparatus of claim 21, in which the trigger circuitry provides the second signal at regular intervals.

26. The apparatus of claim 21, in which the trigger circuitry provides the second signal for a portion of the period of the approximately periodic waveform.

27. The apparatus of claim 21, in which the trigger circuitry provides the second signal during some periods of the approximately periodic waveform for at least part of the period and does not provide the second signal during other periods of the approximately periodic waveform.

28. The apparatus of claim 21, in which the trigger circuitry provides the second signal during each period of the approximately periodic waveform for at least part of the period.

\* \* \* \* \*